(12) United States Patent
Shinn et al.

(10) Patent No.: US 8,289,719 B2
(45) Date of Patent: Oct. 16, 2012

(54) FLEXIBLE DISPLAY MODULE AND METHOD OF MANUFACTURING THE SAME

(75) Inventors: Ted-Hong Shinn, Hsinchu (TW);
Yi-Ming Chiu, Hsinchu (TW);
Yuan-Chih Tsai, Hsinchu (TW);
Yi-Ching Wang, Hsinchu (TW)

(73) Assignee: E Ink Holdings Inc., Hsinchu County (TW)

( * ) Notice: Subject to any disclaimer, the term of this patent is extended or adjusted under 35 U.S.C. 154(b) by 799 days.

(21) Appl. No.: 12/208,228

(22) Filed: Sep. 10, 2008

(65) Prior Publication Data

US 2009/0310314 A1 Dec. 17, 2009

(30) Foreign Application Priority Data

Jun. 13, 2008 (TW) .............................. 97122228 A

(51) Int. Cl.
*H05K 1/00* (2006.01)
(52) U.S. Cl. ........................................ 361/749; 361/720
(58) Field of Classification Search .................. 361/720, 361/760, 748, 736, 749; 174/260–262
See application file for complete search history.

(56) References Cited

U.S. PATENT DOCUMENTS

| | | | |
|---|---|---|---|
| 5,341,233 A | | 8/1994 | Tomoike et al. |
| 5,493,102 A * | | 2/1996 | Takase et al. ................. 219/547 |
| 6,388,339 B1 * | | 5/2002 | Yamamoto et al. ........... 257/787 |
| 6,787,253 B2 * | | 9/2004 | Iwabuchi et al. .............. 428/698 |
| 6,885,146 B2 * | | 4/2005 | Yamazaki et al. ............. 313/498 |
| 7,358,118 B2 * | | 4/2008 | Harada et al. ................. 438/119 |
| 7,531,957 B2 * | | 5/2009 | Sakamoto ...................... 313/504 |
| 7,936,338 B2 * | | 5/2011 | Iwase ............................. 345/173 |
| 2003/0173890 A1 | | 9/2003 | Yamazaki et al. |
| 2005/0023969 A1 * | | 2/2005 | Omata et al. .................. 313/504 |
| 2005/0083307 A1 * | | 4/2005 | Aufderheide et al. ........ 345/173 |
| 2009/0078938 A1 | | 3/2009 | Yamazaki |

FOREIGN PATENT DOCUMENTS

| | | |
|---|---|---|
| JP | 2006259243 A | 9/2006 |
| JP | 2006267977 A | 10/2006 |
| TW | 200304033 A | 9/2003 |

OTHER PUBLICATIONS

Taiwan Official Action issued on May 23, 2012.
GB Examination Report issued on Aug. 21, 2012.

* cited by examiner

*Primary Examiner* — Hung S Bui
(74) *Attorney, Agent, or Firm* — Chun-Ming Shih

(57) ABSTRACT

A flexible display module includes a flexible display panel and at least one flexible circuit board. The flexible display panel includes a flexible plastic substrate, a first driving circuit layer, a display layer and a second driving circuit layer. The thickness of the flexible plastic substrate is smaller than 30 micrometers. The first driving circuit layer having a view area and a peripheral circuit area is disposed on the flexible plastic substrate. The display layer is disposed on the first driving circuit layer and corresponding to the view area. The second driving circuit area is disposed on the display layer. The flexible circuit board is electrically connected to the peripheral circuit area through an anisotropic conductive film. In addition, a method of manufacturing a flexible display module is also provided.

5 Claims, 7 Drawing Sheets

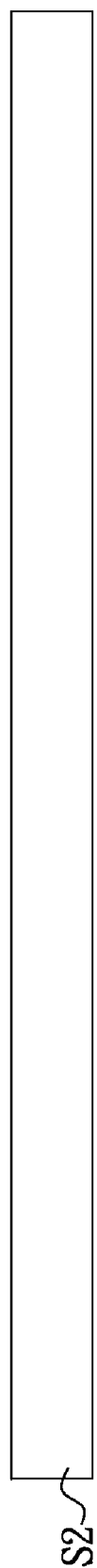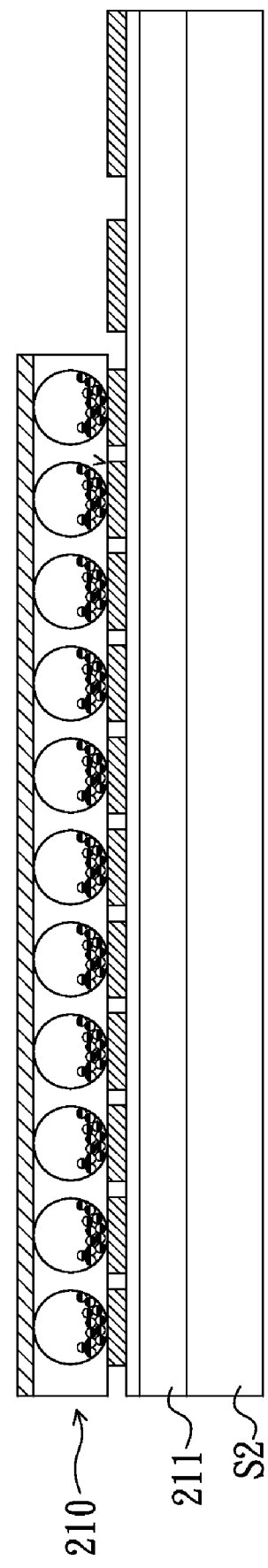
FIG. 4A
FIG. 4B

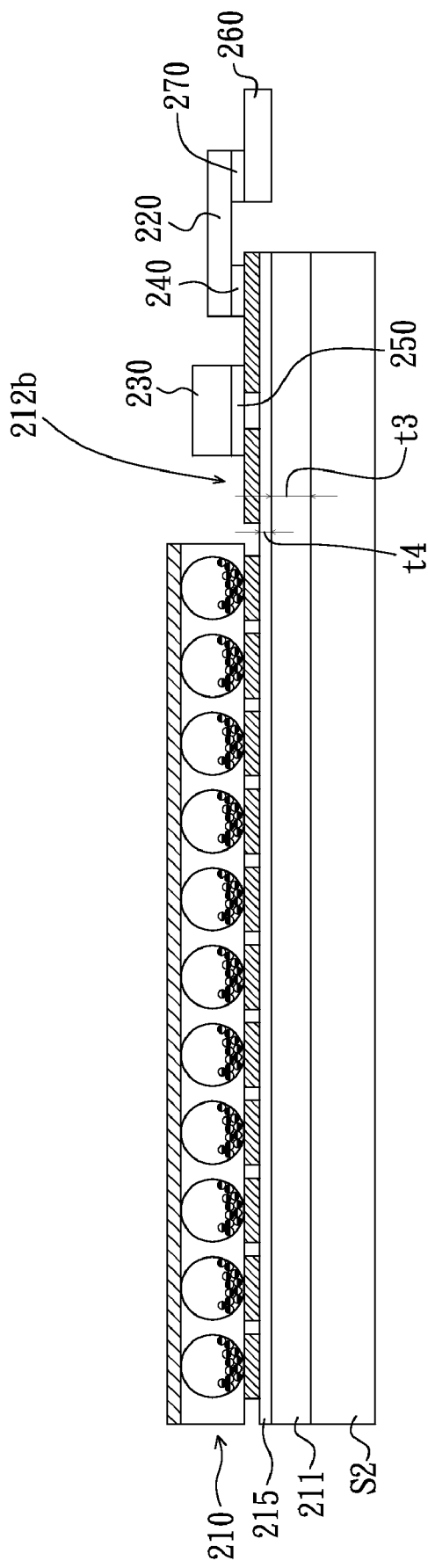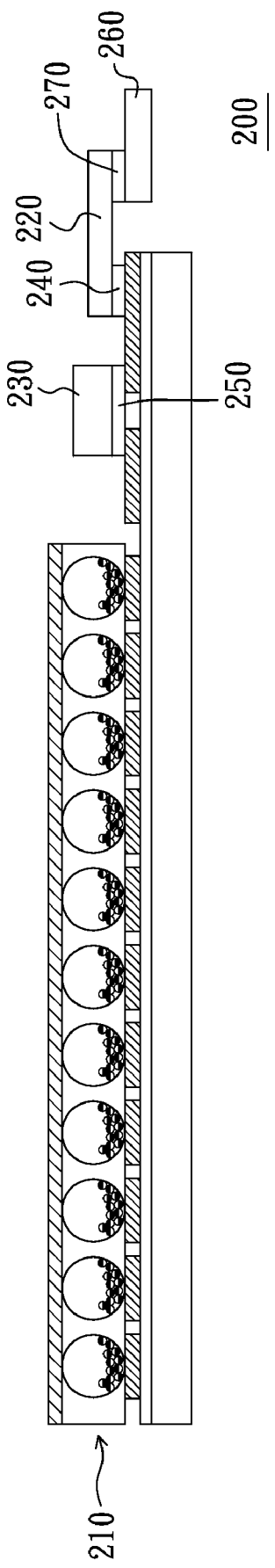
FIG. 4C
FIG. 4D

FLEXIBLE DISPLAY MODULE AND METHOD OF MANUFACTURING THE SAME

BACKGROUND

1. Field of the Invention

The present invention relates generally to a display module and a method of manufacturing the same. More particularly, the present invention relates to a flexible display module and a method of manufacturing the same.

2. Detailed Description of the Related Art

FIG. 1 is a schematic cross-section view of a conventional flexible display module. Please referring to FIG. 1, the conventional flexible display module 100 includes a flexible display panel 110, a plurality of flexible circuit boards 120 and a plurality of drivers 130. The flexible display panel 110 includes a flexible substrate 111, a first driving circuit layer 112, an electrophoretic layer 113, a second driving circuit layer 114 and an insulation attachment layer 115.

The insulation attachment layer 115 is disposed on the flexible substrate 111. The first driving circuit layer 112 is disposed on the insulation attachment layer 115. The first driving circuit layer 112 has a view area 112a and a peripheral circuit area 112b. The view area 112a includes a plurality of pixel electrodes 112c arranged in an array and a plurality of thin film transistors (TFTs) (not shown) corresponding to the pixel electrodes 112c, respectively. The TFTs are attached to the flexible substrate 111 through the insulation attachment layer 115.

The electrophoretic layer 113 is disposed on the first driving circuit layer 112 and corresponding to the view area 112a. The electrophoretic layer 113 has a plurality of microcapsules 113a and the electrophoretic fluid 113b filling in each of the microcapsules 113a. The electrophoretic fluid 113b in each of the microcapsules 113a includes the dielectric solvent 113c and a plurality of charged pigment particles 113d. The charged pigment particles 113d are dispersed in the dielectric solvent 113c.

The second driving circuit layer 114 is disposed on the electrophoretic layer 113. The second driving circuit layer 114 is a transparent conductive thin film composed of Indium-Tin-Oxide (ITO). In other words, the second driving circuit layer 114 is a common ITO electrode. The flexible circuit boards 120 are electrically connected to the peripheral circuit area 112b through a first anisotropic conductive film (ACF) 140. Each of the drivers 130 is an integrated circuit chip (IC chip). The drivers 130 are electrically connected to the peripheral circuit area 112b through a second ACF 150.

FIGS. 2A to 2D are schematic views of manufacturing the flexible display module of FIG. 1. First, please referring to FIG. 2A, a supporting glass substrate S1 is provided. Next, please referring to FIG. 2B, a flexible display panel 110 is formed on the supporting glass substrate S1. Next, please referring to FIG. 2C, each of the flexible circuit boards 120 is thermocompressively bonded to the peripheral circuit area 112b through the first ACF 140. Thereafter, each of the drivers 130 is thermocompressively bonded to the peripheral circuit area 112b through the second ACF 150. Afterwards, please referring to FIGS. 2C and 2D, the supporting glass substrate S1 is removed such that the flexible display module 100 is formed.

However, please referring to FIG. 2C, in the thermocompression bonding process, because the flexible substrate 111 composed of plastic is elastic and the thickness t1 of the flexible substrate 111 is relatively large, the particles (not shown) in the first ACF 140 and the second ACF 150 are fractured incompletely so as to sink in the flexible substrate 111 easily. In addition, in the thermocompression bonding process, because the insulation attachment layer 115 composed of inorganic is brittle and the thickness t2 of the insulation attachment layer 115 is relatively large, cracks are easily brought in the insulation attachment layer 115 such that the circuits of the peripheral circuit area 112b disposed on the insulation attachment layer 115 are easily damaged.

In other words, because the hardness of the supporting glass substrate S1 is relatively large, the hardness of the flexible substrate 111 is relatively low, the thickness t1 of the flexible substrate 111 is relatively large, and the ductility of the insulation attachment layer 115 is relatively bad and the thickness t2 of the insulation attachment layer 115 is relatively large, in the thermocompression bonding process, the circuits of the peripheral circuit area 112b are easily damaged or the particles in the first ACF 140 and the second ACF 150 are fractured incompletely so as to sink in the insulation attachment layer 115 and the flexible substrate 111. Accordingly, the reliability of electrical connection between each of the flexible circuit boards 120 and the peripheral circuit area 112b is reduced and the reliability of electrical connection between each of the drivers 130 and the peripheral circuit area 112b is reduced.

BRIEF SUMMARY

The present invention provides a flexible display module. The reliability of electrical connection between a flexible circuit board of the flexible display module and a peripheral circuit area thereof is improved.

The present invention provides a method of manufacturing a flexible display module which improves the reliability of electrical connection between a flexible circuit board of the flexible display module and a peripheral circuit area thereof.

The present invention provides a flexible display module including a flexible display panel and at least one flexible circuit board. The flexible display panel includes a flexible plastic substrate, a first driving circuit layer, a display layer and a second driving circuit layer. The thickness of the flexible plastic substrate is smaller than 30 μm. The first driving circuit layer is disposed on the flexible plastic substrate. The first driving circuit layer has a view area and a peripheral circuit area. The display layer is disposed on the first driving circuit layer and corresponding to the view area. The second driving circuit layer is disposed on the display layer. The flexible circuit board is electrically connected to the peripheral circuit area through a first ACF.

In an embodiment of the present invention, the flexible plastic substrate may be composed of polyimide (PI).

In an embodiment of the present invention, the flexible display panel further includes an inorganic insulation attachment layer disposed between the flexible plastic substrate and the first driving circuit layer. The thickness of the inorganic insulation attachment layer is smaller than 150 nm. In addition, the inorganic insulation attachment layer may be composed of inorganic oxide or inorganic nitride.

In an embodiment of the present invention, the flexible display module further includes at least one driver electrically connected to the peripheral circuit area through a second ACF.

The present invention provides a method of manufacturing a flexible display module including the following steps. First, a supporting substrate is provided. Next, a flexible display panel is formed on the supporting substrate. The flexible display panel includes a flexible plastic substrate disposed on the supporting substrate, a first driving circuit layer, a display layer and a second driving circuit layer. The thickness of the flexible plastic substrate is smaller than 30 μm. The first driving circuit layer is disposed on the flexible plastic substrate. The first driving circuit layer has a view area and a peripheral circuit area. The display layer is disposed on the first driving circuit layer and corresponding to the view area. The second driving circuit layer is disposed on the display layer. Next, at least one flexible circuit board is thermocompressively bonded to the peripheral circuit area through a first ACF to electrically connect the flexible circuit board and the peripheral circuit area. Afterwards, the supporting substrate is removed.

In an embodiment of the present invention, the flexible plastic substrate may be composed of polyimide.

In an embodiment of the present invention, the flexible display panel further includes an inorganic insulation attachment layer disposed between the flexible plastic substrate and the first driving circuit layer. The thickness of the inorganic insulation attachment layer is smaller than 150 nm. In addition, the inorganic insulation attachment layer may be composed of inorganic oxide or inorganic nitride.

In an embodiment of the present invention, the method of manufacturing the flexible display module further includes the following step. At least one driver is thermocompressively bonded to the peripheral circuit area through a second ACF to electrically connect the driver and the peripheral circuit area. In addition, the temperature of thermocompressively bonding the driver to the peripheral circuit area may be lower than 180° C. The pressure of thermocompressively bonding the driver to the peripheral circuit area may be lower than 0.6 MPa.

In an embodiment of the present invention, the temperature of thermocompressively bonding the flexible circuit board to the peripheral circuit area may be lower than 180° C. The pressure of thermocompressively bonding the flexible circuit board to the peripheral circuit area may be lower than 0.6 MPa.

Because the thickness of the flexible plastic substrate is smaller than 30 μm, the hardness of the flexible plastic substrate is improved. In addition, because the thickness of the inorganic insulation attachment layer is smaller than 150 nm, the elasticity and the ductility of the inorganic insulation attachment layer are improved. Accordingly, in the thermocompression bonding process, the circuits of the peripheral circuit area are not damaged and the particles in the first ACF and the second ACF are not fractured incompletely such that the particles do not sink in the inorganic insulation attachment layer and the flexible plastic substrate. According to the mentioned above, the reliability of electrical connection between the flexible circuit board and the peripheral circuit area is improved and the reliability of electrical connection between the driver and the peripheral circuit area is improved.

BRIEF DESCRIPTION OF THE DRAWINGS

These and other features and advantages of the various embodiments disclosed herein will be better understood with respect to the following description and drawings, in which like numbers refer to like parts throughout, and in which:

FIGS. 4A to 4D are schematic views of manufacturing the flexible display module of FIG. 3.

DETAILED DESCRIPTION

First Embodiment

Figure 1:
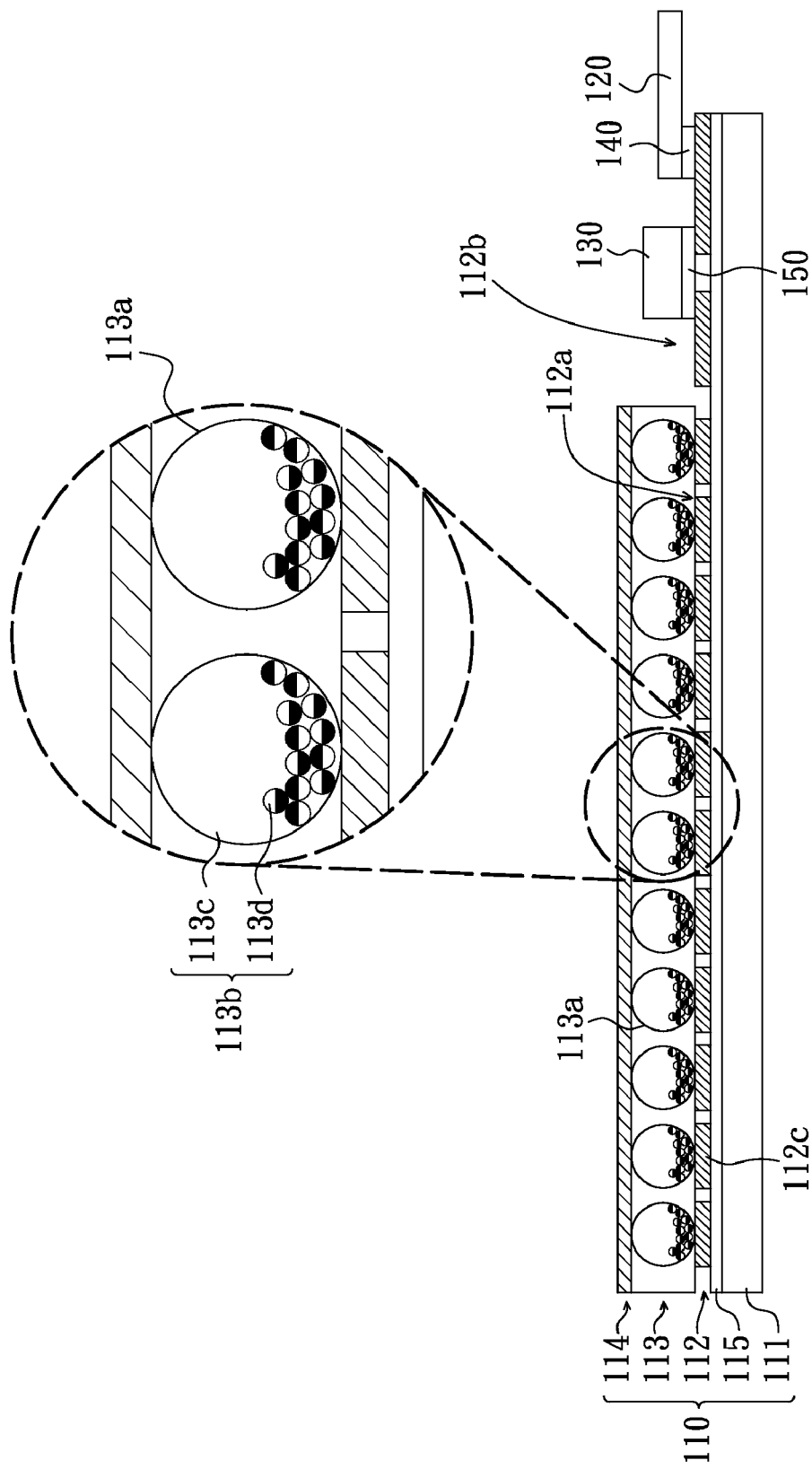
FIG. 1 is a schematic cross-section view of a conventional flexible display module.
Figure 2A:
FIGS. 2A to 2D are schematic views of manufacturing the flexible display module of FIG. 1.
Figure 2B:
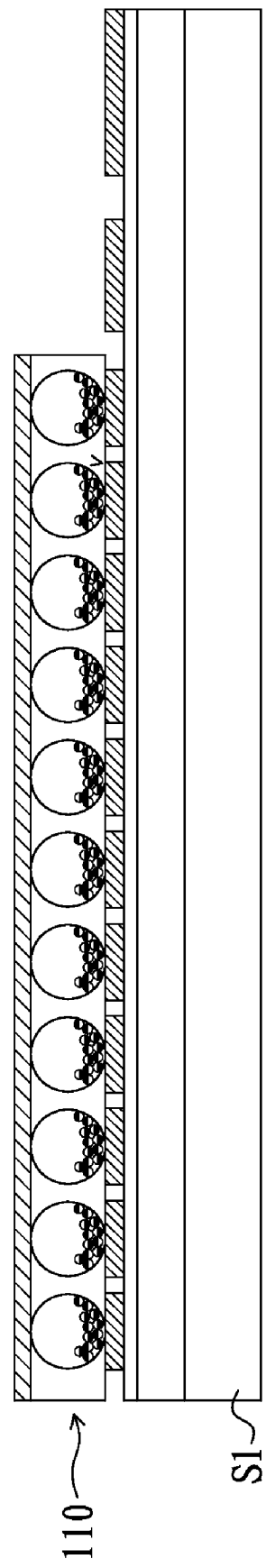
Figure 2C:
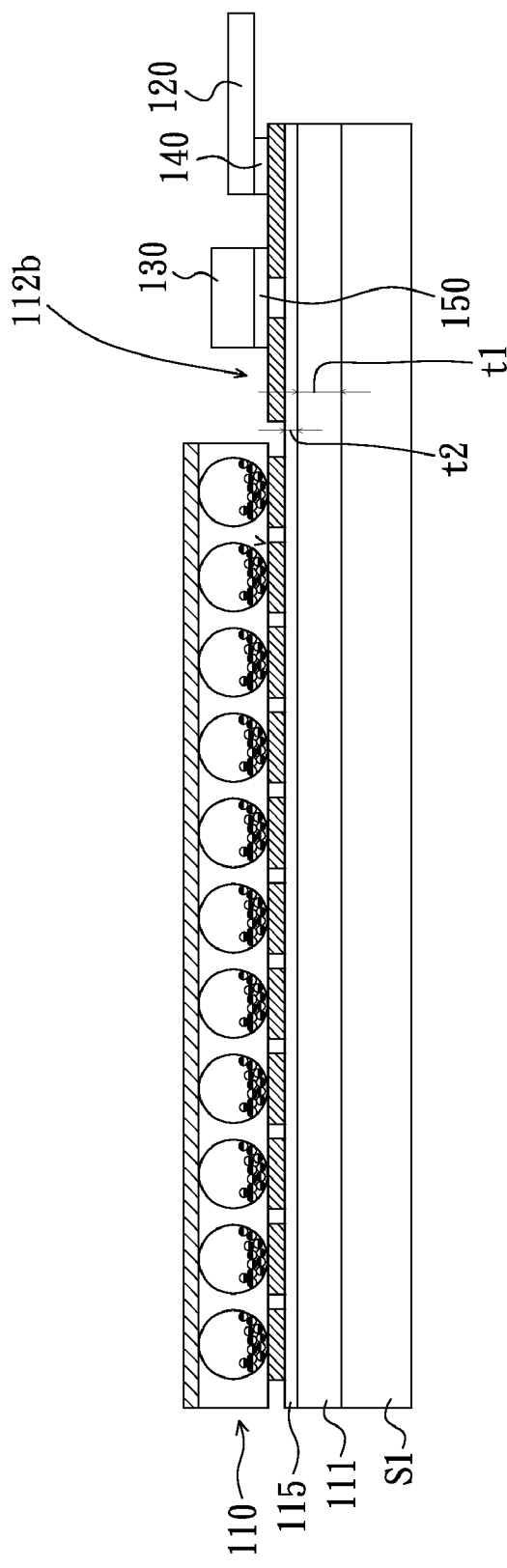
Figure 2D:
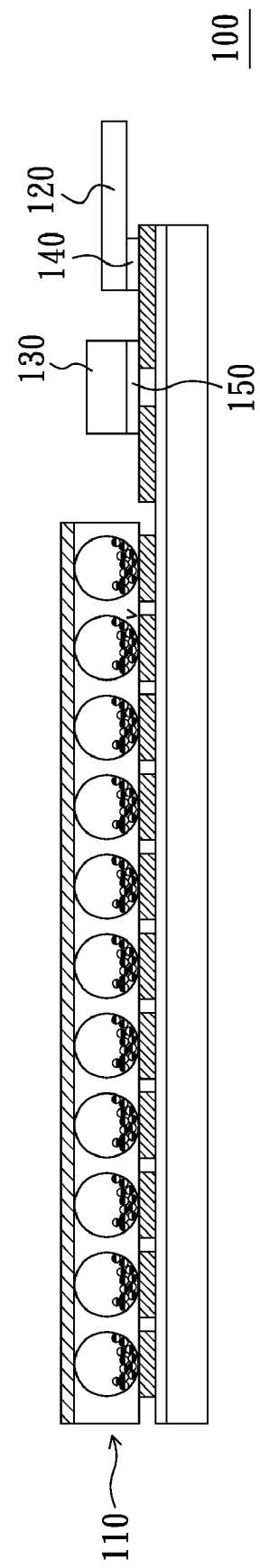
Figure 3:
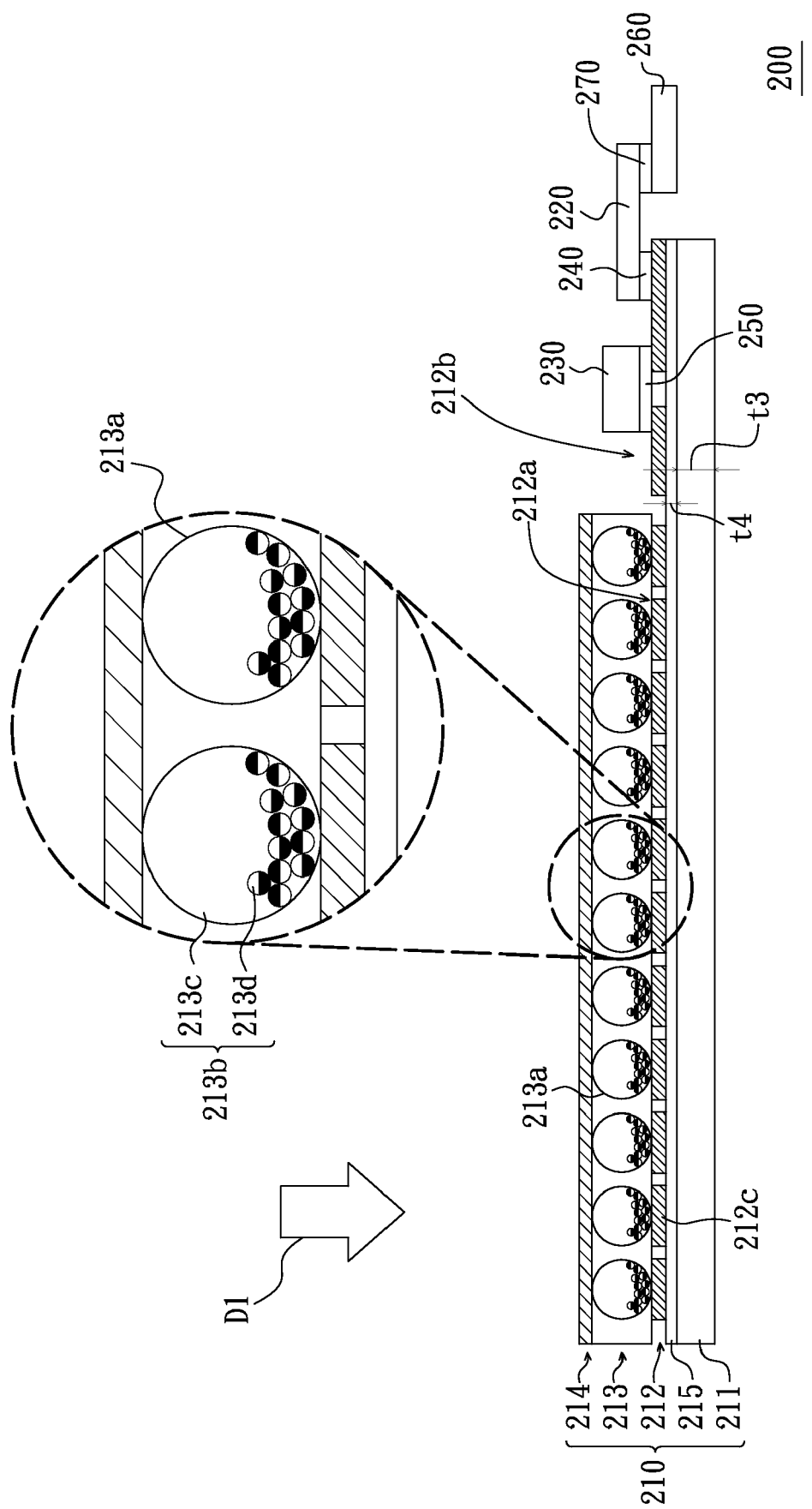
FIG. 3 is a schematic cross-section view of a flexible display module of a first embodiment of the present invention.

FIG. 3 is a schematic cross-section view of a flexible display module of a first embodiment of the present invention. Please referring to FIG. 3, the flexible display module 200 of the present embodiment includes a flexible display panel 210, a plurality of flexible circuit boards 220 (one of the flexible circuit boards 220 is schematically shown in FIG. 3) and a plurality of drivers 230 (one of the drivers 230 is schematically shown in FIG. 3). The flexible display panel 210 includes a flexible plastic substrate 211, a first driving circuit layer 212, a display layer 213, a second driving circuit layer 214 and an inorganic insulation attachment layer 215.

The thickness t3 of the flexible plastic substrate 211 composed of polyimide is smaller than 30 μm. The inorganic insulation attachment layer 215 is disposed on the flexible plastic substrate 211. The thickness t4 of the inorganic insulation attachment layer 215 composed of inorganic oxide or inorganic nitride is smaller than 150 nm. In the present embodiment, the inorganic insulation attachment layer 215 is composed of silicon nitride.

The first driving circuit layer 212 is disposed on the inorganic insulation attachment layer 215. The first driving circuit layer 212 has a view area 212a and a peripheral circuit area 212b. The view area 212a includes a plurality of pixel electrodes 212c arranged in an array and a plurality of TFTs (not shown) corresponding to the pixel electrodes 212c, respectively. The TFTs are attached to the flexible plastic substrate 211 through the inorganic insulation attachment layer 215.

The display layer 213 is an electrophoretic layer disposed on the first driving circuit layer 212 and corresponding to the view area 212a. The display layer 213 has a plurality of microcapsules 213a and an electrophoretic fluid 213b filling in each of the microcapsules 213a. The electrophoretic fluid 213b in each of the microcapsules 213a includes a dielectric solvent 213c and a plurality of charged pigment particles 213d. The charged pigment particles 213d are dispersed in the dielectric solvent 213c. One side of each of the charged pigment particles 213d may be white and another side thereof may be black. In another embodiment, the color of each of the charged pigment particles 213d may be changed. For example, the charged pigment particles 213d in each of the microcapsules 213a may be the combination of black charged pigment particles and white charged pigment particles according to the designer's requirement. In addition, a plurality of microcups may be substituted for the microcapsules 213a of the present embodiment. The scope of the present invention is not limited herein.

The second driving circuit layer 214 is disposed on the display layer 213. The second driving circuit layer 214 is a transparent conductive thin film composed of ITO. In other words, the second driving circuit layer 214 is a common ITO electrode. In another embodiment, the view area 212a of the first driving circuit layer 212 may include a plurality of ITO electrodes parallel to each other. The second driving circuit layer 214 may include a plurality of ITO electrodes parallel to each other. The direction of arrangement of the ITO electrodes of the view area 212a is perpendicular to that of arrangement of the ITO electrodes of the second driving circuit layer 214. However, the above is not shown in the drawings.

The flexible circuit boards 220 are electrically connected to the peripheral circuit area 212b through a first ACF 240. Each of the drivers 230 is an IC chip. The drivers 230 are electrically connected to the peripheral circuit area 212b through a second ACF 250. The flexible display module 200 in the present embodiment further includes a printed circuit board (PCB) 260. The flexible circuit boards 220 are electrically connected to the PCB 260 through a third ACF 270. It should be noted that in another embodiment, the drivers 230 are disposed on the flexible circuit boards 220 respectively or on the PCB 260 according to the designer's requirement.

When the flexible display module 200 of the present embodiment operates, the electrical field in each of the microcapsules 213a is generated between the first driving circuit layer 212 and the second driving circuit layer 214 and specific. At this time, the charged pigment particles 213d move to the second driving circuit layer 214 and the charged pigment particles 213d rotate in various ways to display a kind of information. Accordingly, a user can look at the flexible display panel 210 of the flexible display module 200 in the viewing direction D1 shown in FIG. 3 to read the information displayed.

A method of manufacturing the flexible display module 200 of the present embodiment is described below. FIGS. 4A to 4D are schematic views of manufacturing the flexible display module of FIG. 3. First, please referring FIG. 4A, a supporting substrate S2 which may be composed of glass is provided. Next, please referring FIG. 4B, a flexible display panel 210 is formed on the supporting substrate S2. The flexible plastic substrate 211 of the flexible display panel 210 is disposed on the supporting substrate S2. Next, please referring FIG. 4C, the flexible circuit boards 220 are thermocompressively bonded to the peripheral circuit area 212b through the first ACF 240 to electrically connect each of the flexible circuit boards 220 and the peripheral circuit area 212b. The temperature of thermocompressively bonding the flexible circuit boards 220 to the peripheral circuit area 212b is lower than 180° C. The pressure of thermocompressively bonding the flexible circuit boards 220 to the peripheral circuit area 212b is lower than 0.6 MPa.

Next, the drivers 230 are thermocompressively bonded to the peripheral circuit area 212b through the second ACF 250 to electrically connect each of the drivers 230 and the peripheral circuit area 212b. The temperature of thermocompressively bonding the drivers 230 to the peripheral circuit area 212b is lower than 180° C. The pressure of thermocompressively bonding the drivers 230 to the peripheral circuit area 212b is lower than 0.6 MPa. Next, the flexible circuit boards 220 are thermocompressively bonded to the PCB 260 through the third ACF 270. Afterwards, please referring to FIGS. 4C and 4D, the supporting substrate S2 is removed such that the flexible display module 200 is formed.

Please referring to FIG. 4C, because the thickness t3 of the flexible plastic substrate 211s smaller than 30 μm, the hardness of the flexible plastic substrate 211 is improved. In addition, because the thickness t4 of the inorganic insulation attachment layer 215 is smaller than 150 nm, the elasticity and the ductility of the inorganic insulation attachment layer 215 are improved. Accordingly, in the thermocompression bonding process, the circuits of the peripheral circuit area 212b are not damaged and the particles (not shown) in the first ACF 240 and the second ACF 250 are not fractured incompletely such that the particles do not sink in the inorganic insulation attachment layer 215 and the flexible plastic substrate 211. According to the mentioned above, the reliability of electrical connection between each of the flexible circuit boards 220 and the peripheral circuit area 212b is improved and the reliability of electrical connection between each of the drivers 230 and the peripheral circuit area 212b is improved.

Second Embodiment

Figure 5:
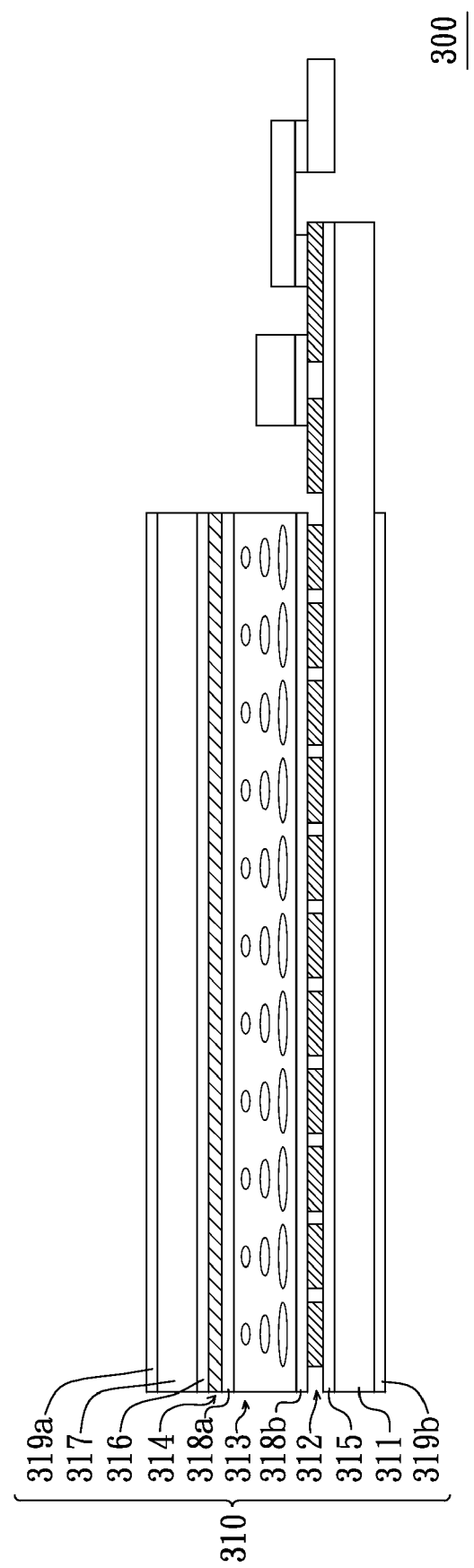
FIG. 5 is a schematic cross-section view of a flexible display module of a second embodiment of the present invention.

FIG. 5 is a schematic cross-section view of a flexible display module of a second embodiment of the present invention. Please referring FIG. 5, the difference between the flexible display module 300 in the second embodiment and the flexible display module 200 in the first embodiment lies in that the display layer 313 is a liquid crystal display layer and the flexible display panel 310 further includes a color filter 316, another flexible plastic substrate 317, an upper alignment layer 318a, a lower alignment layer 318b, an upper polarizer 319a and a lower polarizer 319b. The second driving circuit layer 314 is disposed between the upper alignment layer 318a and the color filter 316. In addition, the flexible display panel 310 further includes a plurality of spacers (not shown) disposed in the display layer 313 to maintain the thickness of the display layer 313.

In addition, the flexible display module 300 may be combined with a backlight module (not shown) to comprise a liquid crystal display such that the light emitted from the backlight module passes through the lower polarizer 319b, the flexible plastic substrate 311, the inorganic insulation attachment layer 315, the first driving circuit layer 312, the lower alignment layer 318b, the display layer 313, the upper alignment layer 318a, the second driving circuit layer 314, the color filter 316, the flexible plastic substrate 317 and the upper polarizer 319a in order.

According to the mentioned above, the flexible display module in each of the embodiments of the present invention and the method of manufacturing the same at least have the following advantages. Because the thickness of the flexible plastic substrate is smaller than 30 μm, the hardness of the flexible plastic substrate is improved. In addition, because the thickness of the inorganic insulation attachment layer is smaller than 150 nm, the elasticity and the ductility of the inorganic insulation attachment layer are improved. Accordingly, in the thermocompression bonding process, the circuits of the peripheral circuit area are not damaged and the particles in the first ACF and the second ACF are not fractured incompletely such that the particles do not sink in the inorganic insulation attachment layer and the flexible plastic substrate. According to the mentioned above, the reliability of electrical connection between each of the flexible circuit boards and the peripheral circuit area is improved and the reliability of electrical connection between each of the drivers and the peripheral circuit area is improved.

The above description is given by way of example, and not limitation. Given the above disclosure, one skilled in the art could devise variations that are within the scope and spirit of the invention disclosed herein, including configurations ways of the recessed portions and materials and/or designs of the attaching structures. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:
1. A flexible display module comprising:
  a flexible display panel comprising:
    a flexible plastic substrate of which the thickness is smaller than 30 μm for improving the hardness of the flexible plastic substrate;

a first driving circuit layer disposed on the flexible plastic substrate, wherein the first driving circuit layer has a view area and a peripheral circuit area;
a display layer disposed on the first driving circuit layer and corresponding to the view area;
a second driving circuit layer disposed on the display layer;
an inorganic insulation attachment layer disposed between the flexible plastic substrate and the first driving circuit layer, the thickness of the inorganic insulation attachment layer being smaller than 150 nm for improving the elasticity and the ductility of the inorganic insulation attachment layer; and
at least one flexible circuit board electrically connected to the peripheral circuit area through a first anisotropic conductive film;
wherein the thickness of the flexible plastic substrate and the thickness of the inorganic insulation attachment layer prevent the first anisotropic conductive film from sinking in the inorganic insulation attachment layer and the flexible plastic substrate for improving reliability of electrical connection between the at least one flexible circuit board and the peripheral circuit area.

2. The flexible display module according to claim 1, wherein the flexible plastic substrate is composed of polyimide.

3. The flexible display module according to claim 1, wherein the inorganic insulation attachment layer is composed of inorganic oxide or inorganic nitride.

4. The flexible display module according to claim 1, further comprising at least one driver electrically connected to the peripheral circuit area through a second anisotropic conductive film.

5. A flexible display module comprising:
a flexible display panel comprising:
 a flexible plastic substrate of which the thickness is smaller than 30 μm;
 a first driving circuit layer disposed on the flexible plastic substrate, wherein the first driving circuit layer has a view area and a peripheral circuit area;
 a display layer disposed on the first driving circuit layer and corresponding to the view area;
 a second driving circuit layer disposed on the display layer;
 an inorganic insulation attachment layer disposed between the flexible plastic substrate and the first driving circuit layer, the thickness of the inorganic insulation attachment layer being smaller than 150 nm; and
at least one flexible circuit board electrically connected to the peripheral circuit area through a first anisotropic conductive film;
wherein the display layer is a liquid crystal display layer, the flexible display panel further includes a color filter, another flexible plastic substrate, an upper alignment layer, a lower alignment layer, an upper polarizer, and a lower polarizer, the second driving circuit layer is disposed between the upper alignment layer and the color filter, the lower polarizer is disposed underside the flexible plastic substrate, the lower alignment layer is disposed between the display layer and the first driving circuit layer, and the upper polarizer is disposed on the another flexible plastic substrate.

* * * * *